US 6,401,036 B1

(12) United States Patent
Geier et al.

(10) Patent No.: US 6,401,036 B1
(45) Date of Patent: Jun. 4, 2002

(54) HEADING AND POSITION ERROR-CORRECTION METHOD AND APPARATUS FOR VEHICLE NAVIGATION SYSTEMS

(75) Inventors: George J. Geier, Scottsdale; Russel Figor, Mesa; Troy L. Strother, Tempe, all of AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/678,598

(22) Filed: Oct. 3, 2000

(51) Int. Cl.[7] .................. G01C 19/00; G01C 21/06; G01C 21/26; G01C 21/28; G01C 22/02; G01S 1/02; G01S 5/02; G06G 3/00; G06G 7/00; G06G 9/00; G06G 165/00; G06G 13/00; G06G 15/16; G06G 17/10; G06G 19/00

(52) U.S. Cl. .................. 701/214; 701/214; 701/213; 701/207; 701/217; 701/220; 701/216; 701/224; 701/221; 701/26; 701/200; 702/150; 702/93; 702/96; 702/92; 702/99; 342/357.14; 342/357.08; 342/357.02; 342/457; 342/359; 342/107; 342/163; 340/436; 340/500; 340/903; 340/988; 340/995; 180/167; 180/168

(58) Field of Search .................. 701/214, 16, 213, 701/207, 23, 300, 217, 220, 216, 224, 221, 26, 208, 25, 200, 41, 3, 301; 702/150, 93, 92, 96, 99; 342/357.14, 457, 357.08, 359, 357.02, 31, 357.03, 456, 107, 163; 340/500, 436, 995, 988, 435, 903; 375/148, 150; 180/167, 168; 246/122 R, 121

(56) References Cited

U.S. PATENT DOCUMENTS

| | | | | |
|---|---|---|---|---|
| 5,075,693 A | * | 12/1991 | McMillan et al. | 342/457 |
| 5,297,028 A | * | 3/1994 | Ishikawa | 364/571.03 |
| 5,319,561 A | * | 6/1994 | Matsuzaki | 364/454 |
| 5,339,246 A | * | 8/1994 | Kao | 364/457 |
| 5,680,313 A | * | 10/1997 | Whitaker et al. | 364/460 |
| 5,784,029 A | * | 7/1998 | Geier | 342/357 |
| 5,986,547 A | * | 11/1999 | Korver et al. | 340/500 |
| 6,029,111 A | * | 2/2000 | Croyle | 701/207 |
| 6,055,477 A | * | 4/2000 | McBurney et al. | 701/207 |
| 6,091,359 A | * | 7/2000 | Geier | 342/357.14 |
| 6,240,367 B1 | * | 5/2001 | Lin | 701/214 |
| 6,243,657 B1 | * | 6/2001 | Tuck et al. | 702/150 |
| 6,249,542 B1 | * | 6/2001 | Kohli et al. | 375/150 |

* cited by examiner

Primary Examiner—William A. Cuchlinski, Jr.
Assistant Examiner—Ronnie Mancho
(74) Attorney, Agent, or Firm—John King (57) ABSTRACT

The present invention provides methods and devices that enable correction of gyroscope bias and gyroscope bias drift in low-cost, vehicular navigation and positioning systems without using estimates of position and heading, and subsequent correction of heading and position errors resulting from gyroscope bias and bias drift, without relying on assumptions regarding gyroscope bias or predetermined time-dependent gyroscope bias drift profiles. The invention improves over existing GPS/DR systems that do not compensate for actual gyroscope bias instability, but instead correct the heading and position error that is induced by the bias instability and then correct estimates of gyroscope bias based on the corrected position and heading. The inventive methods provided herein can be used with any DR vehicle positioning system that uses a gyroscope.

51 Claims, 5 Drawing Sheets

HEADING AND POSITION ERROR-CORRECTION METHOD AND APPARATUS FOR VEHICLE NAVIGATION SYSTEMS

BACKGROUND OF THE INVENTION

1. Field of the Invention

The present invention relates to navigational systems. Specifically, the invention relates to methods of compensating for bias drift in gyroscopes used in vehicle navigational systems having a dead reckoning component, and subsequently correcting heading and position errors resulting from the gyroscope bias and gyroscope bias drift.

2. Description of Related Art

Numerous automotive navigational systems have been developed in recent years for such applications as providing real-time driving directions and providing emergency services for automobiles. These navigational systems typically include a satellite-based positioning system or a "dead reckoning system" (DRS), or a combination of the two. In a dead reckoning system, the heading and position of a vehicle are determined using sensors such as gyroscopes and odometers. Typically, automobile navigational and positioning systems use a DRS having an interface between a transmission odometer (for tracking speed and distance) and a gyroscope (to track the vehicle's heading). Dead reckoning systems are often used in tandem with a satellite-based navigational system such as a Global Positioning System ("GPS").

The Global Positioning System (GPS) is a satellite-based radionavigation system developed and operated by the U.S. Department of Defense. GPS allows land, sea and airborne users to constantly determine their three-dimensional position, velocity, and time anywhere in the world with a precision and accuracy far better than other radionavigation systems currently available. The GPS consists of three segments: user, space and control. The user segment consists of individual receivers, processors, and antennas that allow land, sea or airborne operators to receive GPS satellite broadcasts and compute their precise position, velocity and time from the information received from the satellites. Use of GPS receivers in automotive navigation, emergency messaging, and tracking systems is now widespread. GPS receivers have been miniaturized to comprise only a few integrated circuits for individual use.

The space segment consists of 24 satellites in orbit around the Earth and positioned so that at any time between five and eight satellites are "in view" to a user at any particular position on the surface of the earth. These satellites continuously broadcast both position and time data to users throughout the world.

The control segment consists of five land-based control and monitoring stations located in Colorado Springs (master control station), Hawaii, Ascension Island, Diego Garcia, and Kwajalein. These stations monitor transmissions from the GPS satellites as well as the operational status of each satellite and its exact position in space. The master ground station transmits corrections for the satellite's position and orbital data back to the satellites. The satellites synchronize their internally stored position and time with the data broadcast by the master control station, and the updated data are reflected in subsequent transmissions to the user's GPS receiver, resulting in improved prediction accuracy.

In general, a minimum of four GPS satellites must be tracked by the receiver to derive a three-dimensional position fix. The fourth satellite is required to solve for the offset between the local time maintained by the receiver's clock and the time maintained by the GPS control segment (i.e., GPS time); given this synchronization, the transit time measurements derived by the receiver can be converted to range measurements and used to perform triangulation. Navigational systems based solely on GPS, therefore, generally do not work well in dense city environments, where signal blockage and reflection by tall buildings, in addition to radio frequency (RF) interference, often occurs. GPS accuracy also suffers in situations where the GPS satellites are obscured from the vehicle's field of view, e.g. when the vehicle is in a tunnel or dense foliage environments.

In combination systems, such as navigational systems having both DR and GPS components, heading and position data from each component are used to compensate for measurement errors occurring in the components. The dual component system also provides a backup system in the event that one component fails, for example, DRS provides continuous heading and position information even when the GPS satellites are obscured from the view of the vehicle, and thus no reliable GPS information is available.

Dead reckoning systems, however, are only as accurate as their component sensors, which are often low-cost and low-fidelity. For example, the gyroscopes typically used in dead reckoning systems are vibrational gyroscopes, which are known to have severe performance limitations. The performance of low-cost gyroscopes is directly correlated to gyroscope bias, a measure of a gyroscope's deviation from an ideal or perfect gyroscope, and bias drift, the rate of change of the bias resulting from changes in environmental conditions over time. Gyroscope bias is determined by the gyroscope's reading at zero angular rate, which a perfect gyroscope would read as zero. Gyroscope biases can be as large as several degrees per second for automotive-quality gyroscopes.

In the case of the commonly used vibrational gyroscope, a vibrating beam is used to determine heading changes. Over time, the vibrational characteristics of the beam change and these changes result in changes in the measured angular rate, even when there is no rotation of the beam, thus producing the gyroscope bias drift. Significantly, bias drift produces a position error that grows quadratically with distance traveled for a vehicle moving at a constant speed. For example, a bias of only 0.055 deg/sec produces a position error of 5% of distance traveled, or 50 meters, after 1 kilometer of travel and 25% of distance traveled, or 1.25 kilometers, after 5 kilometers of travel. While the position error can be compensated for using GPS under conditions where a minimum of four satellites are in view of the vehicle, the error cannot be effectively compensated for during periods of GPS outage such as occur in tunnels or dense foliage environments. It is therefore desirable to have methods for correcting heading and position errors in dead reckoning systems resulting from gyroscope bias and gyroscope bias drift.

Methods for correcting heading and position errors in vehicle navigation systems, including methods of compensating for gyroscope bias, are known in the art. Most existing methods, however, use positions determined by the dead reckoning or GPS components to correct for gyroscope bias. Other existing methods rely on predetermined calibration curves for gyroscope bias and bias drift. Further alternative existing methods are useful only for high-end gyrsoscopes, or use redundant gyroscopes that increase the cost and/or size of the dead reckoning system.

U.S. Pat. No. 3,702,477 to Brown teaches a Kalman filter method for estimating the gyroscope bias of an aircraft-quality inertial measurement unit comprising at least three gyroscopes and three accelerometers, using position error measurements constructed from the Navy Navigation Satellite System, a predecessor to GPS.

U.S. Pat. Nos. 4,537,067 and 4,454,756 to Sharp et al. teach compensation for temperature-dependent gyroscope bias drift by controlling the temperature of the gyroscope environment and estimating gyroscope bias using INS position data.

U.S. Pat. No. 4,987,684 to Andreas et al. teaches a method of compensating for gyroscope drift in an inertial survey system by using position updates generated by a Kalman filter algorithm method.

U.S. Pat. No. 5,194,872 to Musoff et al. teaches a method of compensating for gyroscope bias in an aircraft inertial navigation system (INS) by using output from a set of redundant gyroscopes to correlate bias.

U.S. Pat. No. 5,278,424 to Kagawa teaches a method of compensating for gyroscope using position information obtained from a digital map database.

U.S. Pat. No. 5,297,028 to Ishikawa and U.S. Pat. No. 5,527,003 to Diesel et al. teach a method of compensating for temperature-dependent gyroscope bias by determining and applying a calibration curve for gyroscope bias as a function of temperature.

U.S. Pat. No. 5,416,712 to Geier et al. discloses use of a Kalman filter algorithm method for correcting future heading and position error growth, based upon an assumption of constant gyroscope bias drift rate between position updates.

U.S. Pat. No. 5,543,804 to Buchler et al. teaches a method for combining GPS and inertial navigation systems data for improved attitude determination accuracy that incorporates a Kalman filter algorithm method for estimating the gyroscope biases of the INS.

U.S. Pat. No. 5,583,774 to Diesel teaches calibration of gyroscope bias using GPS position and velocity data.

There remains a need in the art for methods and devices that enable correction of gyroscope bias and gyroscope bias drift in low-cost, vehicular navigation and positioning systems without using estimates of position and heading, and subsequent correction of heading and position errors resulting from gyroscope bias and bias drift. There further remains a need in the art for methods of compensating for heading and position errors induced by gyroscope bias that are not dependent on assumptions of a constant gyroscope bias or a specified gyroscope bias drift profile.

SUMMARY OF THE INVENTION

The present invention provides methods and devices that enable correction of gyroscope bias and gyroscope bias drift in low-cost, vehicular navigation and positioning systems without using estimates of position and heading, and subsequent correction of heading and position errors resulting from gyroscope bias and bias drift, without relying on assumptions regarding gyroscope bias or predetermined time-dependent gyroscope bias drift profiles. The invention improves over existing GPS/DR systems that do not compensate for actual gyroscope bias instability, but instead correct the heading and position error that is induced by the bias instability and then correct estimates of gyroscope bias based on the corrected position and heading. The inventive methods provided herein can be used with any DR vehicle positioning system that uses a gyroscope.

In a first aspect, the invention provides methods for overcoming positional and heading errors induced by gyroscope bias in low-cost automotive positioning and navigational systems. Use of a "stationary period" for the car enables an intrinsic readjustment of the gyroscope bias without user intervention. The inventive methods compute the gyroscope bias drift rate from successive bias measurements and correct the estimates of the vehicle's heading and position error in delayed real-time using previously-computed heading and position change components that are saved within a navigational system processor. The process of estimating the heading and position error and correcting the saved or measured heading and position data is iterated at every stationary period.

In alternative preferred embodiments, the methods of the invention are used in an emergency call system or external vehicle tracking system. Emergency call systems (ECS) can be triggered by an automobile equipped with push-button access to emergency services or activated by airbag deployment. The ECS establishes a communication link, such as a cellular telephone link or a satellite link, with the service center and transmits vehicle heading and position data to the emergency service center. In ECS embodiments, the methods of the invention are used in "non-real time" or to correct heading and position error off-line using gyroscope bias estimates transmitted with vehicle position data and heading information from the vehicle to the service center. The service center uses the transmitted data to calculate a current vehicle position and dispatches assistance to the vehicle.

Specific preferred embodiments of the present invention will become evident from the following more detailed description of certain preferred embodiments of the claims.

BRIEF DESCRIPTION OF THE DRAWINGS

FIGS. 2A and 2B are flowcharts illustrating the elements of a preferred embodiment using GPS as the reference vehicle position system.

DETAILED DESCRIPTION OF PREFERRED EMBODIMENTS

The present invention provides methods for removing positional and heading errors induced in low-cost gyroscopes used in vehicular navigational systems.

As used herein, the term "vehicle" refers to any land-, air-, or water-based transportation mechanism, including, but not limited to automobiles, airplanes, helicopters and boats.

As used herein, the term "gyroscope bias" refers to a measure of a gyroscope's deviation from an ideal or perfect gyroscope, and is determined as the difference between the gyroscope's reading at zero angular rate and the reading of a "perfect" gyroscope (which would read zero under these conditions).

As used herein, the term "bias drift" refers to the tendency of the gyroscope bias to change over time in response to environmental changes. Bias drift is affected by factors including temperature changes, vehicle acceleration, local magnetic effects, and hours of usage.

As used herein, the term "GPS time" refers to a measure of time maintained by the GPS master control station. The term "GPS second" refers to a particular measure of GPS time. GPS satellites maintain an internal time that is calibrated with transmissions of GPS time in GPS seconds from the master control station. As used herein, the term "time offset" refers to the difference between GPS time and the time maintained by a GPS processor in a vehicle navigational system, which is not continuously synchronized with GPS time.

Standard linear algebra conventions and terminology are used throughout the specification. An uncapitalized bold letter indicates a vector (e.g. x), a capitalized bold letter indicates a matrix (e.g. P), a superscript T indicates the transpose of the vector or matrix (e.g. $x^T$, $P^T$), and a negative one superscript for a matrix indicates the inverse of the matrix (e.g. $P^{-1}$).

Figure 1:
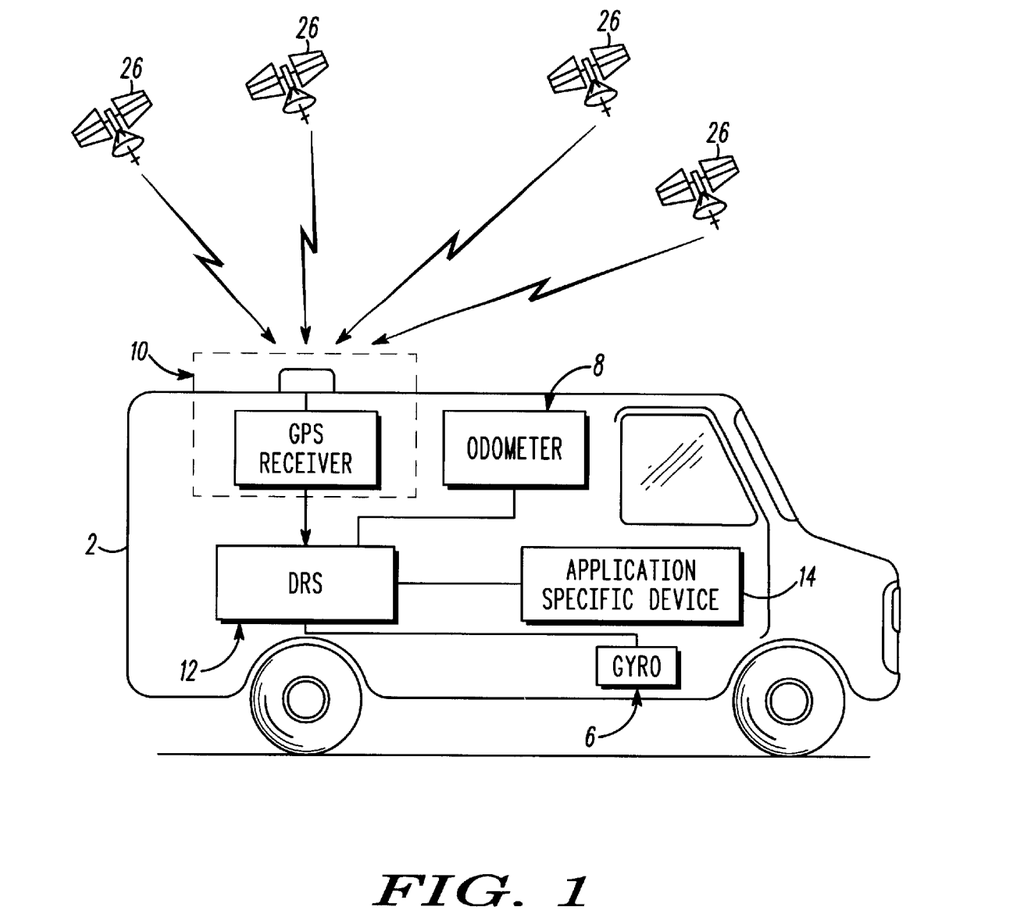
FIG. 1 illustrates a preferred vehicle navigational system having GPS and DR components.

FIG. 1 illustrates a particularly preferred embodiment of a navigational system 2 for a vehicle 4 comprising a heading sensor 6, a distance-traveled sensor 8, a reference vehicle position system 10, a DRS 12 that receives heading and position data from the heading sensor 6, the distance-traveled sensor 8, and the reference vehicle position system 10, and an application specific device ("ASD") 14 that receives heading and position data from the DRS 12. The inventive methods provided herein, however, may be used with any vehicle navigational system 2 having a DRS and do not require that navigational system 2 include a reference vehicle position system 10 or an ASD 14.

Heading sensor 6 may be located anywhere in vehicle 4. Preferably, heading sensor 6 is a gyroscope. When heading sensor 6 is a gyroscope, the axis of the gyroscope that measures angular velocity ("sensitive axis") must be oriented toward the local vertical to sense the rate of change in heading. If the sensitive axis of the gyroscope is horizontally oriented, the gyroscope would measure the pitch rate of vehicle 4 rather than heading change. The invention is preferably used with low-cost gyroscopes such as those available from Murata, Matsushista/Panasonic, and Tokin. Gyroscope output is typically analog and in units of voltage. The gyroscope has a bias, or an offset reading at zero angular velocity, that is time dependent.

Distance-traveled sensor 8 is preferably an odometer 18; however, the invention is not limited to such an embodiment. There are two fundamental types of odometers 18 known to those in the art: reluctance sensors, which use passive magnetic flux change to measure velocity, and Hall effect sensors, which are active and detect wheel rotations. The preferred system and method will work with any pre-installed odometer 18 in vehicle 4; however, the invention preferably uses a reluctance sensor-based odometer. Odometer 18 output is typically in units of pulse counts when a Hall effect sensor is used. Each pulse in the pulse count refers to a specific amount of wheel rotation, preferably ¹⁄₂₄th to ¹⁄₄₈th of the circumference of a tire. Those of skill in the art will recognize that alternative velocity or distance-traveled sensors, including but not limited to Doppler radar installed underneath vehicle 4 or one or more lateral accelerometers, would be equally useful in the invention.

Figures 2A, 2B:
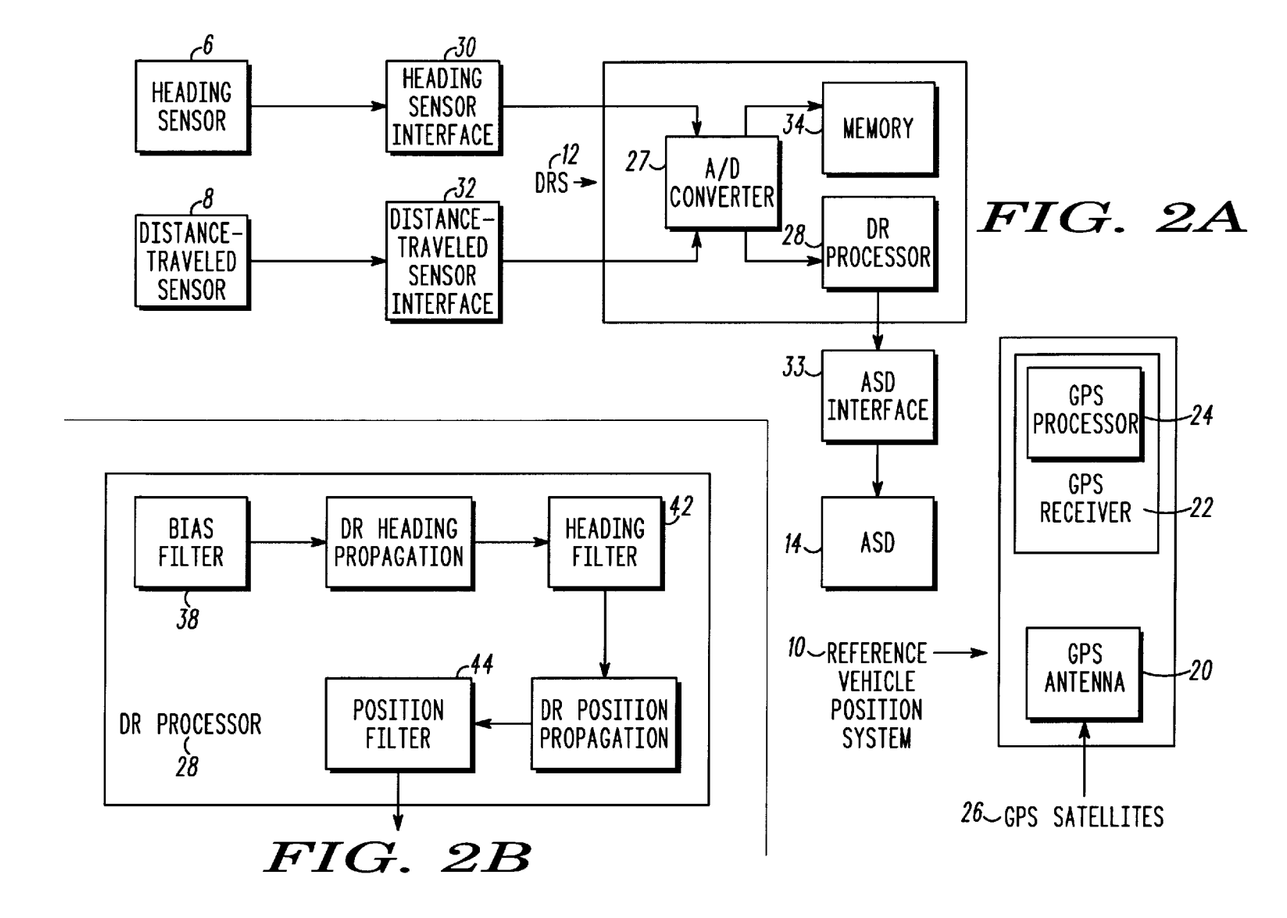
FIG. 2A illustrates the complete system.
FIG. 2B is an exploded view of the elements of the DR processor.

Preferably, reference vehicle position system 10 comprises a satellite-based vehicle positioning system, including systems based on GPS, GLONASS, or Galileo satellites. Most preferably, reference vehicle position system 10 comprises a GPS system. More specifically, vehicle reference position system 10 preferably comprises a GPS antenna 20 and a GPS receiver 22 in communication with GPS antenna 20. FIG. 2A illustrates an embodiment, wherein the reference vehicle position system 10 is a GPS system. Vehicle reference position system 10 also preferably comprises a GPS processor 24. GPS satellites 26 transmit heading and position data information to GPS component vehicle reference position system 10. Satellite 26 transmissions are received by GPS antenna 20 and transmitted to receiver GPS receiver 22. Data from four GPS satellites 26 is typically required for GPS processor 24 to determine a three-dimensional position fix (latitude, longitude, and altitude) and velocity for vehicle 4. Data from three of the GPS satellites 26 is used to triangulate the position of vehicle 4, while data from the fourth satellite 20 provides a time offset.

DRS 12 preferably comprises an analog-to-digital converter ("A/D converter") 27, a DR processor 28, a heading sensor interface 30, a distance-traveled sensor interface 32, an ASD interface 33, and a memory 34. DRS processor 28 preferably comprises a bias drift rate filter 38, a heading filter 42, and a position filter 44, as illustrated in FIG. 2B. Preferably DRS 12 receives heading change data from heading sensor 6 via heading sensor interface 30 and distance-traveled data from the distance-traveled sensor 8 via distance-traveled sensor interface 32. The heading change data from heading sensor 6 and the distance-traveled data from the distance-traveled sensor 8 are converted from analog to digital signals in the A/D converter 27, and transmitted to the DR processor 28. When vehicle navigational system 2 includes a reference position system 10, DRS 12 also receives reference heading and position data from reference position system 10. In embodiments where reference position system 10 is a GPS system, the DRS 12 also receives reference heading and position data from GPS receiver 22.

DRS 12 converts the heading sensor output to a heading change in units of degrees or radians and the distance-traveled sensor 18 output to units of meters. DRS 12 then integrates GPS heading and position data with heading and position data received from heading sensor 6 and distance-traveled sensor 8 to determine the current heading and position of vehicle 4. DR processor 28 also transmits the integrated heading and position data to ASD 14 via ASD interface 33. In a preferred embodiment, DRS 12 is preferably integrated into GPS receiver 22. In such embodiments, GPS receiver 22 preferably further comprises an analog-to-digital converter for converting the output of heading sensor 6 and distance-traveled sensor 8 to digital signals.

For automotive vehicle navigation applications, ASD 14 may include, but is not limited to, a map-matching and display unit for providing driving directions or a system for transmitting a vehicle's position to an emergency call service ("ECS"). The invention is not limited to these embodiments, however, and those of skill in the art will recognize the utility of the invention for any application that requires heading and position data. Preferably, ASD 14 includes a separate processor 36. In a particularly preferred embodiment, ASD processor 36 is embedded in GPS receiver 22. In an alternative preferred embodiment, the GPS processor 24 may be embedded in ASD 14.

ASD 14 may provide an interface to a cellular phone or radio for establishing a communication link to a nearby service center, emergency call center or other third party that requires tracking of vehicle 4. In these embodiments, the vehicle 4 transmits accumulated heading and position data, along with heading sensor bias data, to the service center, emergency call center or other third party. The methods of the invention are then used offline in non-real-time to determine a corrected heading and position for vehicle 4. Examples of such non-real time systems include existing GPS applications such as the General Motors OnStar System.

Figure 3:
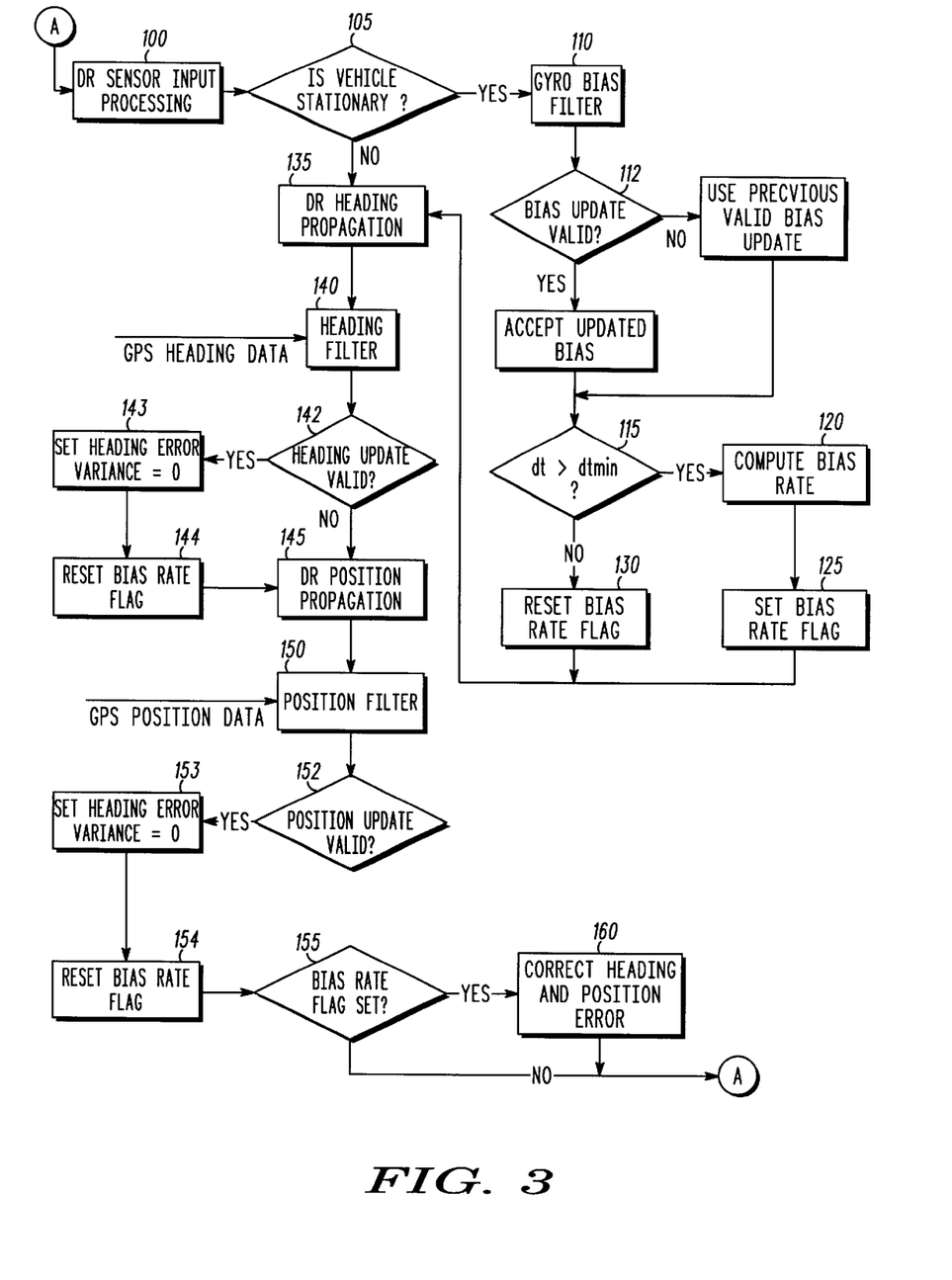
FIG. 3 is a flowchart illustrating the steps of a delayed real-time embodiment of the position error correction methods of the invention.

A preferred embodiment of a method for compensating for heading and position errors induced by gyroscope bias and gyroscope bias drift is illustrated in the flowchart of FIG. 3. The method may comprise a software routine resident in DR processor 28, GPS receiver 22, ASD processor 36, or at an external location, such as an emergency call center. Moreover, the method may be performed in a delayed real-time application in the vehicle 4, or in an offline, non real-time application, such as at an emergency call center.

Two separate periodic time scales are preferably used in the method: one having a constant period for performing updates irrespective of whether the vehicle 4 is in motion or stationary and one having a variable length period defined by the time between vehicle stationary points for performing updates when the vehicle is stationary. In the equations that follow, the constant period time scale is indicated by the subscript j, while the stationary period time scale is indicated by the subscript k. Preferably the constant period time scale is 1 Hz.

Heading sensor 6 bias drift rate is preferably only updated at stationary points, while the heading and position of vehicle 4 are preferably updated continuously using the constant period time scale. In an alternative preferred embodiment, the heading of vehicle 4 is updated continuously using the constant period time scale and the position of vehicle 4 is update only when the accumulated heading change has reached a minimum value, in order to preserve computational cycles. In these embodiments, the position of vehicle 4 is preferably updated when the heading change is between about 0.1 and about 2.0 degrees, more preferably when the heading change is between about 0.2 and about 1.0 degrees, and most preferably when the heading change is about 0.5 degrees.

The initial step 100 of a preferred method is transmitting heading data from heading sensor 6 ($\Delta H_s$) and position data from distance-traveled sensor 8 ($P_s$) to DRS 12, via heading sensor interface 30 and distance-traveled sensor interface 32, respectively. DR processor 28 then converts the data received from analog data ($\Delta H_s$, $P_s$) to digital data ($\Delta H_D$, $P_D$) having units usable by the correction method. Conversion of the data from an analog to a digital signal results in a quantization error, which is accounted for in the heading sensor bias update procedure, as discussed below.

In step 105, the method next uses a first computational means to determine whether the vehicle is stationary. Several methods are useful for determining whether the vehicle is stationary. If a Hall-effect sensor is used in the odometer, a single zero pulse count is a reliable indication of a stationary condition. If a reluctance sensor is used in the odometer, the odometer can read zero at very low speed (when the vehicle may be turning), and thus more than one successive zero reading is required to indicate a stationary condition. The number of successive zero readings required is dependent on the sensor used, the driver, and the driving conditions; however, for sensors commonly used in automotive applications, five to ten successive zero readings is sufficient to indicate a stationary condition. The number of successive zero readings required should be selected based on a balance between a conservative estimate that may miss short duration stationary points and an overly optimistic estimate that may indicate more stationary periods than actually occur. Alternatively, the method taught in pending U.S. application Ser. No. 08/834,966, filed Apr. 7, 1997, entitled "Methods of Gyro Bias Estimation Using GPS," which is incorporated herein by reference, can be used. That method uses GPS measurements collected over a period of at least one second to determine whether the vehicle is stationary.

If the vehicle is stationary, a second computational means updates the heading sensor bias (b). Preferably, the second computational means is a heading sensor bias filter 34 (hereinafter "bias filter 34"), as shown in step 110. As input, bias filter 34 receives the heading sensor reading while the vehicle is stationary ($\Delta H_D(t_k)$). Bias filter 34 is preferably a simple, fixed gain filter; a variable gain, low pass filter; or a Kalman filter. Most preferably, heading sensor bias filter 34 is a Kalman filter, as the Kalman filter can appropriately model both the quantization error associated with the analog to digital conversion of heading sensor and distance-traveled sensor data and the expected stability of the bias from past measurements.

The discrete Kalman filter is a set of mathematical equations that provides an efficient, recursive, computational solution of the least-squares method with samples at discrete time intervals. The Kalman filter allows for estimations of past, present and future events. The Kalman filtering process is well-known by those in the art, and was initially described in Kalman, R. E., "A New Approach to Linear Filtering and Prediction Problems," J. Basic Eng., March, 1960, pp. 35–45. The standard equations used in the Kalman filter are:

$$G_n = P_n^* H_n^T (H_n P_n^* H_n^T + V_n)^{-1}$$

$$P_n = P_n^* - G_n (H_n P_n^* H_n^T + V_n) G_n^T$$

$$x_n = x_n' + G_n (Y_n - \hat{y}_n')$$

$$x'_{n+1} = \Phi_n x_n$$

$$P_n^* = \Phi_{n-1} P_n \Phi^T_{n-1} + Q_{n-1}$$

where $\Delta t$=time increment between $t_n$ and $t_{n+1}$ $\Phi_n$=state transition matrix $x_n$=true state at time $t_n$ $x_n$=optimum estimate of x after using all of the measured data through $Y_{n-1}$ $x_n'$=optimum estimate of x after using all of the measured data through $Y_n$ $G_n$=Kalman gain matrix $Y_n$=measurement at time $t_n$ $\hat{Y}_n' = H_n x_n$ $P_n^*$=covariance matrix of the estimation error ($x_n' - x_n$)σ*

$P_n$=covariance matrix of the estimation error ($x_n' - x_n$)

$H_n$=measurement matrix $V_n$=covariance matrix of the measurement error by $\delta Y_n$ $Q_n$=covariance matrix of the response of the states to all white noise driving functions.

Using initial estimates for the state vector ($x_0$) and the error covariance matrix ($P_0$), a new state vector can be estimated at any subsequent time. Numerous publications detail the application of the Kalman filter. See, e.g., Haykin, *Adaptive Filter Theory* 2d. ed. (1991). The Kalman filter approach to forward prediction of a state vector is well understood by those of skill in the art and will not be discussed further herein.

In the Kalman filter embodiments of the heading sensor bias filter 34, the state vector is a single state vector containing the heading sensor bias. Bias filter 34 calculates a forward prediction of the heading sensor bias (b'($t_k$)). A statistical test is then performed to assess the validity of the update (Step 112). The measured bias ($b_m(t_k)$) is tested against the current prediction of the heading sensor bias available from bias filter 34 (b'($t_k$)), to test for a change which is excessive based on the expected stability of the bias and the time between stationary points. Preferably, the statistical test is a three-sigma test, wherein if the difference between the measured bias and the predicted bias is greater than three standard deviations from the expected value of the bias, the test fails. This relationship is shown in Equation 1:

$$b(t_k) = b'(t_k) \quad \text{if} \quad |b'(t_k) - b_m(t_k)| < 3\sigma_b \tag{1}$$

$$b'(t_{k-1}) \quad \text{if} \quad |b'(t_k) - b_m(t_k)| \geq 3\sigma_b$$

If the test fails (i.e., the bias change is excessive), the updated bias predicted by bias filter 34 is not accepted, and the previous valid prediction is used. If the test is passed, then the predicted heading sensor bias (b') is passed to the Kalman filter and updated. The updated heading sensor bias is then stored in the DRS memory 34 of the processor performing the compensation for bias instability. If the vehicle 4 is moving, the method proceeds to step 135 and begins the routine of updating heading and position based upon the previously stored heading sensor bias (b'($t_{k-1}$)).

Following the update of heading sensor bias, a third computational means is used to calculate a bias drift rate (r). To avoid obtaining inaccurate and invalid bias drift rate estimates during a single stationary period that may result from the presence of noise in the system, bias drift rate is calculated only if the time between stationary periods (Δt) exceeds a minimum value ($\Delta t_{min}$), as shown in Steps 115 and 120. Preferably $\Delta t_{min}$ is the longest period vehicle 3 is expected to remain stationary, for example 60 seconds. The amount of time elapsed between the current stationary period ($t_k$) and the time of the previous stationary period ($t_{k-1}$) is designated Δt, and is calculated using Equation 2 (Step 115):

$$\Delta t = t_k - t_{k-1} \tag{2}$$

If Δt exceeds the predetermined time limit, $\Delta t_{min}$, the heading sensor bias drift rate is calculated using Equation 3 (Step 120):

$$r = (b'(t_k) - b'(t_{k-1}))/(t_k - t_{k-1}) \quad \text{if} \quad \Delta t > \Delta t_{min} \tag{3}$$

A bias drift rate flag 40 is also updated during the gyroscope bias drift rate update procedure (Step 125). The bias drift rate flag 40 may be zero or non-zero. A non-zero rate flag 40 indicates that an updated gyroscope bias drift rate is available for correcting heading and position. In the bias drift rate routine, if Δt does not exceed $\Delta t_{min}$, the bias drift rate flag 40 is reset to zero, indicating that no update of the bias drift rate is available. If Δt does exceed $\Delta t_{min}$, the bias drift rate flag 40 is set to a non-zero value following the bias drift rate calculation to indicate the availability of an updated bias drift rate (Step 130)

Following the calculation of bias drift rate, vehicle 4 heading and position are updated as illustrated in the remaining steps of FIG. 3. At current stationary point $t_k$, heading and position errors have already developed based upon the drift in bias between the stationary periods. Therefore, the method operates to correct these errors in delayed real-time. As the correction algorithm method requires only that vehicle 4 stop for a specific amount of time, the method is effective during long GPS outage periods (e.g., when vehicle 4 is operating in tunnels that are several kilometers in length).

In step 135, the DR heading is propagated ahead in time using the heading change computed in step 100 ($\Delta H_D$), as shown in Equation 4.

$$H_{DR} = H(t) = H(t-1) + \Delta H_D \tag{4}$$

The propagated heading ($H_{DR}$) is then input to a fourth computational means for integrating the DR propagated heading and the heading generated by the vehicle reference position system. Preferably the fourth computational means is a heading filter 42. Preferably heading filter 42 is a Kalman filter.

When heading filter 42 is a Kalman filter, a forward estimate of heading error covariance ($\sigma_H$) must also be performed. So that the heading error attributable to gyroscope bias drift is not accounted for twice, the heading error variance increment attributable to gyroscope bias instability ($\Delta\sigma^2_H$) is updated in DR heading propagation step 135, using Equations 5–7:

$$\Delta\sigma^2_b = \Delta\sigma^2_b + q_b \tag{5}$$

$$\sigma_{Hb} = \sigma_{Hb} + \Delta\sigma^2_b \tag{6}$$

$$\Delta\sigma^2_H = \Delta\sigma^2_H + 2\sigma_{Hb} \tag{7}$$

where $\Delta\sigma^2_b$ is the gyroscope bias error variance induced by the instability, $q_b$ is the process noise associated with the gyroscope bias measurement stability, and $\sigma_{Hb}$ is the error correlation between the heading error and the gyroscope bias error used by the heading filter 42. The process noise, $q_b$, is computed from the gyroscope manufacturer's specifications. The calculated heading error variance increment is then subtracted from the total accumulated heading error variance when the gyroscope bias instability compensation is applied, thereby preventing double compensation for bias drift rate. The gyroscope bias error variance associated with gyroscope instability, $\Delta\sigma^2_b$, is reset to zero at each stationary point update.

The heading filter 42 then blends the reference heading provided by the reference vehicle position system 10 and the DRS heading using a standard Kalman filter as described above to produce an updated heading (H') (Step 140). Following update of the heading in the heading filter 42, a statistical test is applied to assess the validity of the update. The test for validity of the update is preferably the Kalman filter residual test, which examines the difference between the reference vehicle position system heading ($H_{GPS}$) and the DR propagated heading (H'). If the difference is excessive relative to the predicted error variance, using the standard three sigma test, the test is failed. The actions of the heading filter 42 and the bias drift rate filter 34 are complementary, i.e., they both cannot be applied in the same cycle, but must be applied sequentially. Therefore, if the updated heading passes the statistical test, the accumulated heading error attributable to gyroscope bias drift rate, $\Delta\sigma^2_H$, is reset to zero (Step 143), and the bias drift rate flag is reset to zero (Step 144) to prevent double correction for gyroscope bias drift rate. If the residual test is failed, the reference vehicle position system heading update is not processed, as shown below in Equation 8:

$$H(t_j) = H'(t_j) \quad \text{if } |H'(t_j) - H_{GPS}| < 3\sigma_H \quad (8)$$

$$H(t_{j-1}) \quad \text{if } |H'(t_j) - H_{GPS}| \geq 3\sigma_H$$

Once the heading has been updated, the position is updated. In DR position propagation step 145, a forward estimate of position is calculated using the heading data corrected by the heading filter 42 and distance-traveled data calculated by DR processor 28 based on odometer output. The distance traveled east ($\Delta p_e$) is calculated by multiplying the total distance traveled ($\Delta d_D$) by the sine of the average heading is the distance moved east, while distance traveled north ($\Delta p_n$) is calculated by multiplying the total distance traveled by the cosine of average heading, as shown in Equations 9–10 is the distance moved north.

$$\Delta p_e(t_j) = \Delta d_D * \sin((H(t_j) + H(t_{j-1}))/2) \quad (9)$$

$$\Delta p_n(t_j) = \Delta d_D * \cos((H(t_j) + H(t_{j-1}))/2) \quad (10)$$

East and north position change measurements, $\Delta p_e$ and $\Delta p_n$, are saved to DR processor 28 in an array indexed in time.

As with heading corrections, to prevent multiple corrections for bias drift rate, the east and north position error variance increments attributable to gyroscope bias drift rate, $\Delta \sigma^2_{pe}$ and $\Delta \sigma^2_{pn}$ respectively, are separately accumulated in DR position propagation step 165 using Equations 11–14:

$$\sigma_{pnH} = \sigma_{pnH} + \Delta p_e \Delta \sigma^2_H \quad (11)$$

$$\sigma_{peH} = \sigma_{peH} + \Delta p_n \Delta \sigma^2_H \quad (12)$$

$$\Delta \sigma^2_{pn} = \Delta \sigma^2_{pn} + 2\Delta p_e \sigma_{pnH} + \Delta p_e^2 \Delta \sigma^2_H \quad (13)$$

$$\Delta \sigma^2_{pe} = \Delta \sigma^2_{pe} + 2\Delta p_n \sigma_{peH} + \Delta p_n \sigma_{peH} + \Delta p_n^2 \Delta \sigma^2_H \quad (14)$$

where $\Delta p_n$ is the change in north position in the current cycle, $\Delta p_e$ is the change in east position over the current cycle, $\sigma_{peH}$ is the error variance matrix relating the heading error with the east position error, and $\sigma_{pnH}$ is the error variance matrix relating the heading error and north position error. The position error variances, $\Delta \sigma^2_{pe}$ and $\Delta \sigma^2_{pn}$, are subtracted from the total accumulated position error variance components when the bias instability compensation is applied.

Following DR position propagation step 145, a fifth computation means combines reference vehicle position system horizontal position components with the DR position calculated in step 150. Preferably the fifth computational means is a position filter 44. Preferably, position filter 44 is a Kalman filter. If a valid reference vehicle positions system position update is performed (Step 152), the accumulated position error variance increments attributable to the gyroscope bias instability, $\Delta \sigma^2_{pe}$ and $\Delta \sigma^2_{pn}$, are reset to zero (Step 153) and the bias drift rate flag is reset to zero (Step 154). Again, the validity test is preferably the Kalman filter residual test, as shown in Equations 15 and 16:

$$p_e(t_j) = p'_e(t_j) \quad \text{if } |p'_e(t_j) - p_{e,GPS}| < 3\sigma_{pe} \quad (15)$$

$$p_e(t_{j-1}) \quad \text{if } |p_e(t_j)' - p_{e,GPS}| \geq 3\sigma_{pe}$$

$$p_n(t_j) = p'_n(t_j) \quad \text{if } |p_n(t_j)' - p_{n,GPS}| < 3\sigma_{pn} \quad (16)$$

$$p_n(t_{j-1}) \quad \text{if } |p_n(t_j)' - p_{n,GPS}| \geq 3\sigma_{pn}$$

In step 155, the bias drift rate flag is checked. If the rate flag is zero, indicating the absence of an updated bias drift rate, processing is complete for the current cycle, and the next processing cycle is started. If the rate flag is non-zero, the heading error and position error induced by the gyroscope bias instability are corrected using a sixth computational means, as shown in step 160, using Equations 17–19:

$$\Delta H_{corr} = \Delta H_{corr} + r\Delta t^2/2 \quad (17)$$

$$\Delta p_{ecorr} = \Delta p_{ecorr} + \Delta p_n \Delta H_{corr}/2 \quad (18)$$

$$\Delta p_{ncorr} = \Delta p_{ncorr} + \Delta p_n \Delta H_{corr}/2 \quad (19)$$

where $\Delta H_{corr}$ is the heading correction, and $\Delta p_{ecorr}$ and $\Delta p_{ncorr}$ are the corrections to the east and north position changes computed at each time interval by the DRS 12, respectively.

The heading and positions errors are accumulated to the current stationary point, $t_k$. The corrections are then applied to the current computed heading and positions in a seventh computational means, as shown in Equations 20–22:

$$H(t_k) = H(t_{k-1}) - \Delta H_{corr} \quad (20)$$

$$L(t_k) = L(t_{k-1}) - \Delta p_{ncorr}/R_e \quad (21)$$

$$\lambda(t_k) = \lambda(t_{k-1}) - \Delta p_{ecorr}/(R_e \cos L) \quad (22)$$

where $H(t_k)$ is the DR system heading data at time $t_k$, $L(t_k)$ is the DR system latitude at time $t_k$, $\lambda(t_k)$ is the DR system longitude at time $t_k$, and $R_e$ is the earth's equatorial radius.

In a delayed real-time implementation, inherent time limitations exist which necessitate that only the heading correction be accumulated each second between heading and position updates. Computations of position corrections are saved in DR processor 28 to be used for the next set of corrections while heading corrections are taking place. Thus, in a real-time implementation of Equations 17 through 22, only Equation 17 would be performed each second, with the remaining equations used when the heading correction, $\Delta H_{corr}$, had reached some minimum level, for example 0.5 degrees.

Each time that the corrections indicated by Equation 20 through 22 are applied, the heading and position error variances are similarly adjusted using Equations 23 through 25:

$$\sigma^2_H = \sigma^2_H - \Delta \sigma^2_H \quad (23)$$

$$\sigma^2_{pe} = \sigma^2_{pe} - \Delta \sigma^2_{pe} \quad (24)$$

$$\sigma^2_{pn} = \sigma^2_{pn} - \Delta \sigma^2_{pn} \quad (25)$$

where $\sigma^2_H$ is the heading error variance, and $\sigma^2_{pe}$ and $\sigma^2_{pn}$ are the east and north position error variances, respectively. Equations 23 through 25 produce a greater level of post-correction confidence in the heading and position estimates.

Figure 4:
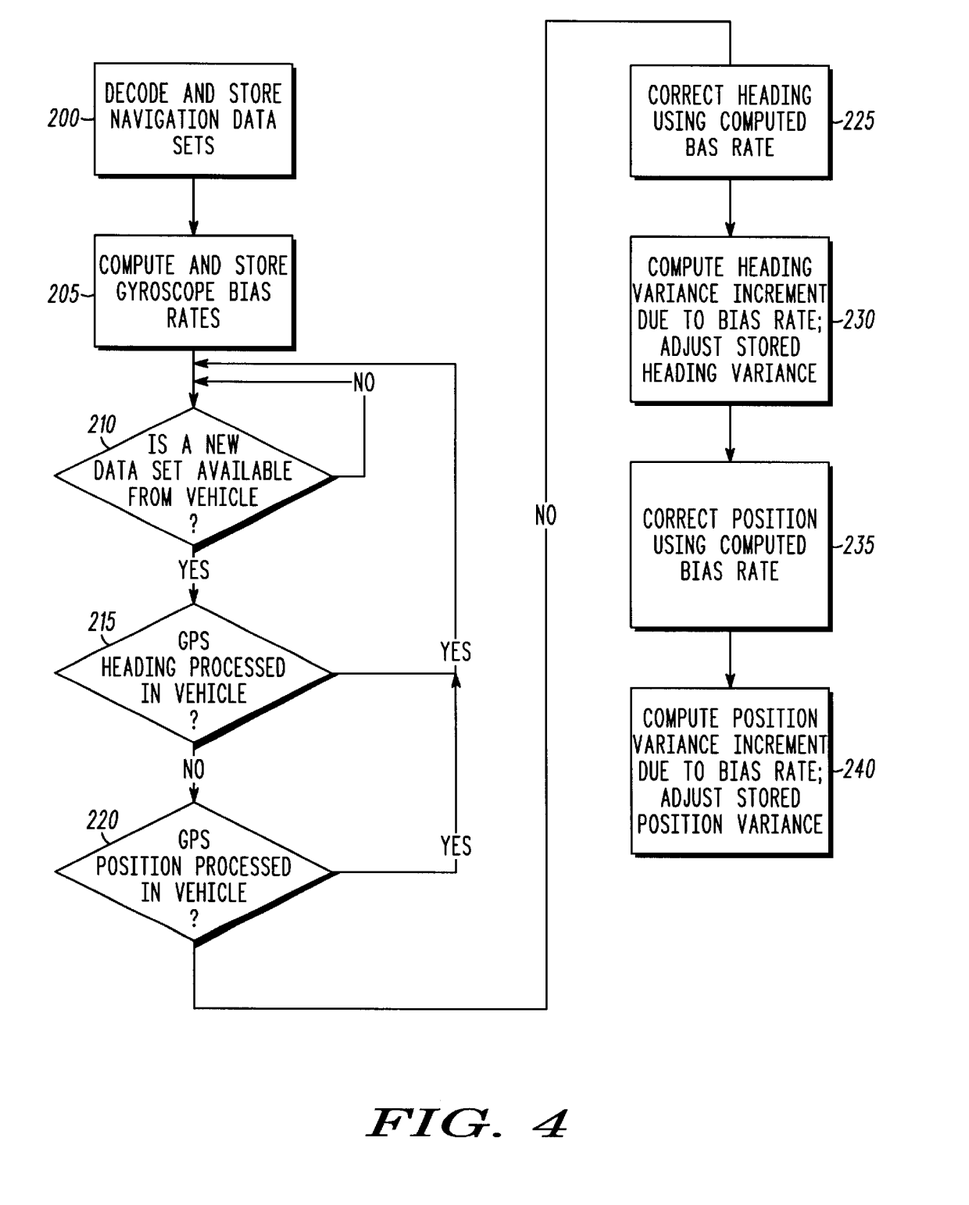
FIG. 4 is a flowchart illustrating the steps of a non-real-time embodiment of the position error correction methods of the invention.

The correction method may also be performed off-line, as illustrated in FIG. 4. This embodiment of the present invention is advantageously used for emergency messaging, where a history of heading and position data is transmitted form the vehicle 4 via a communications link 46 to a service center 48 and used for locating the vehicle 4. Unlike the delayed real-time implementation depicted in FIG. 4, which is performed by a software method resident in a microprocessor within GPS processor 24 or DR processor 28 in the vehicle 4, the off-line software method is preferably implemented in a device such as a microcomputer resident at the service center 48.

In a preferred off-line embodiment, vehicle 4 transmits heading and position data over a communication link 46 to a service center 48. The off-line software begins by decoding the transmitted data and storing the transmitted data set, as indicated in step 200. The data typically includes position components (latitude and longitude) and speed and heading of the host vehicle 4 computed in real-time by the host vehicle's navigation system 2. In addition, the data may include quality information, in the form of heading and position error variance information, also computed by the navigation system 2 in real-time according to the methods of the invention previously described. Preferably, the data includes an estimate of the gyroscope bias computed by the navigation system 2, and a signal indicating that the heading and position data were processed in vehicle 4. As the off-line software in the service center receives the received heading and position data, the gyroscope bias drift rate is computed and stored from successive gyroscope bias estimates using Equation 3.

In step 205, the off-line system checks for a transmission from vehicle 4. Typically, vehicle 4 will transmit a set of data including all points from the initial startup of the vehicle to the time of transmission to the service center 48. Thus, after transmission, service center 48 has received a time-indexed set of data for processing in non-real-time. If a set of data is not available from vehicle 4, no processing step occurs (Step 210). The off-line software only performs a correction if it receives an indication from vehicle 4 that no real-time correction to the data was made. Thus, the software checks for a heading correction and then a position correction, as shown in Steps 215 and 220. If the data indicates that a real-time heading correction was performed, the off-line system waits for transmission of the next data set. If the data indicates that no heading correction was performed, the off-line system checks for a real-time position correction. If a real-time position correction is indicated, the off-line system waits for transmission of the next data set, otherwise an off-line correction is performed (Steps 225–240). In the off-line correction, the heading, heading variance increment, position and position variance increments are corrected using the routines described above for real-time correction. The service center 48 may then dispatch the appropriate assistance to the vehicle 4 at the corrected position.

The invention is more fully illustrated in the following Examples. These Examples illustrate certain aspects of the invention. These Examples are shown by way of illustration and not by way of limitation.

EXAMPLE 1

Delayed Real-Time Heading and Position Error Correction

Figure 5:
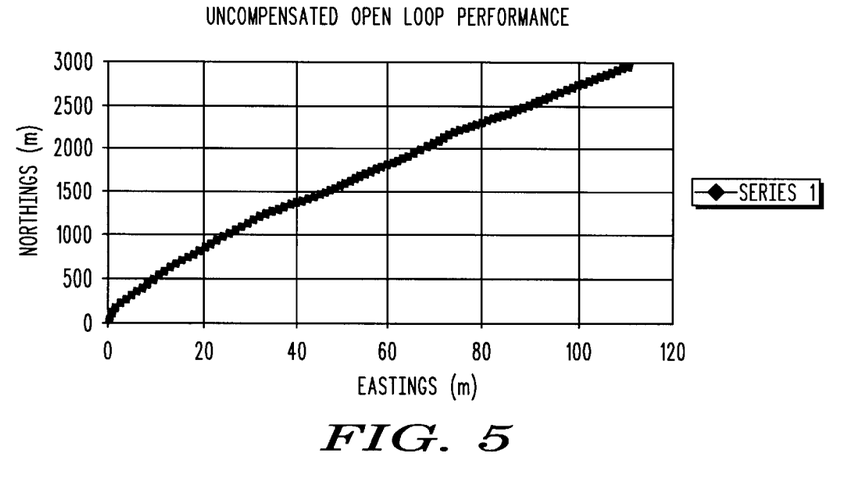
FIG. 5 is uncompensated heading and position data for a test vehicle.
Figure 6:
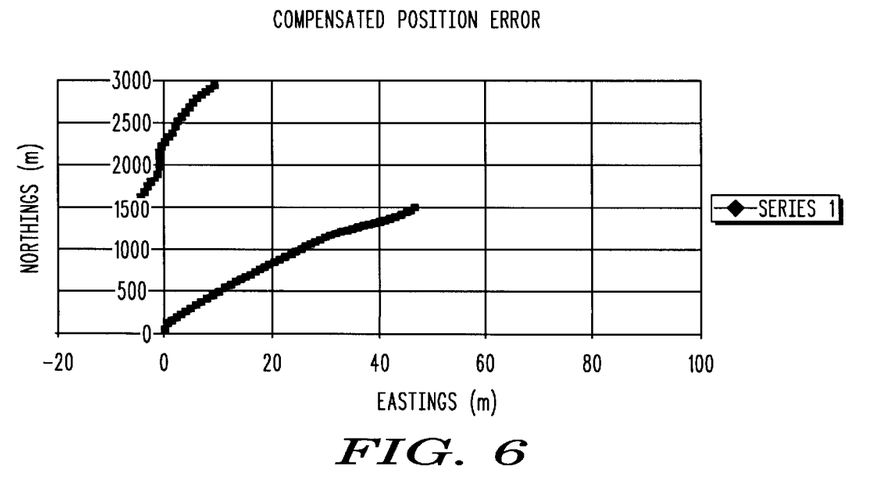
FIG. 6 is compensated heading and position data for a test vehicle.

To demonstrate the effectiveness of the real-time implementation of the invention, sample test data is presented in FIGS. 5 and 6. The data was collected using a Toyota Camry with an integrated GPS/DR system as a test vehicle using a Motorola 8 channel ONCORE receiver and DR system test board, including the low cost gyro, and interface to the vehicle's odometer, and a microprocessor with built-in A/D converter. The system inclued a Murata gyroscope and an interface to the vehicle's odometer. The invention was tested while the vehicle traveled due north. The GPS antenna was disconnected for 3 kilometers of travel. As shown in FIG. 5, significant cross-track error equaling approximately 3.7% of the distance traveled developed without a correction mechanism in place.

The dominant contributor to the positional error increase was the drift associated with the low-cost gyroscope's bias as shown by increase in the error between two stationary points. The first stationary period was just prior to disconnecting the GPS antenna while stopped at a traffic light and the second stationary period was approximately 1.5 km after the first stationary period.

The delayed real-time solution depicted in FIG. 5, together with the derived heading and gyroscope bias estimates, was compensated off-line using the present invention. FIG. 6 displays the resulting compensated positional error. Using the compensation routine of the invention, cross-track position error was reduced to 0.3% of distance traveled.

Those skilled in the art will appreciate that many of the elements described herein are functional entities that may be implemented as discrete components, in any suitable combination and location. Further, various method steps and functions described herein as being performed by one or more elements may be carried out by a processor executing an appropriate set of machine language instructions stored in memory. Provided with the present disclosure, those skilled in the art can readily prepare appropriate computer instructions to perform such functions.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams. The claims should not be read as limited to the described order or elements unless stated to that effect. Therefore, all embodiments that come within the scope and spirit of the following claims and equivalents thereto are claimed as the invention.

What is claimed is:

1. A vehicle navigational system having built-in error correction comprising:

(a) a distance traveled sensor;

(b) a heading sensor having a bias that drifts over time;

(c) a dead reckoning system having a distance traveled sensor interface and a heading sensor interface, wherein the dead reckoning component receives distance-traveled data from the distance-traveled sensor and heading data from the heading sensor and generates a first set of vehicle position data and a first set of vehicle heading data;

(d) a reference vehicle position system in direct communication with the dead reckoning component, wherein the reference vehicle position system generates a second set of vehicle heading data and a second set of vehicle position data to the dead reckoning system;

(e) a first computational means for determining if the vehicle is stationary;

(f) a second computational means for generating an updated heading sensor bias;

(g) a third computational means for generating a heading sensor bias drift rate;

(h) a fourth computational means for integrating the first set of vehicle heading data and the second set of vehicle heading data into an integrated vehicle heading;

(i) a fifth computational means for integrating the first set of vehicle position data and the second set of vehicle position into an integrated vehicle heading;

(j) a sixth computational means for calculating an integrated vehicle heading correction using the estimated bias drift rate to compensate for integrated vehicle heading errors induced by heading sensor bias drift and an integrated vehicle position correction using the first integrated vehicle heading correction to compensate for integrated vehicle position errors induced by heading sensor bias drift; and (k) a seventh computational means for calculating a corrected vehicle heading and position.

2. The apparatus of claim 1 wherein the heading sensor is a gyroscope.

3. The apparatus of claim 1 wherein the heading sensor is a low-cost gyroscope.

4. The apparatus of claim 1 wherein the heading sensor is a vibrational gyroscope.

5. The apparatus of claim 1 wherein the distance-traveled sensor is an odometer.

6. The apparatus of claim 1 wherein the dead reckoning system comprises a dead reckoning processor, a heading sensor interface, and a distance-traveled sensor interface.

7. The apparatus of claim 6 wherein the heading sensor interface is a gyroscope interface.

8. The apparatus of claim 6 wherein the distance-traveled sensor interface is an odometer interface.

9. The apparatus of claim 1 wherein the reference vehicle position system comprises a satellite-based positioning system.

10. The apparatus of claim 9 wherein the satellite-based positioning system is the Global Positioning System, GLONASS, or Galileo satellite positioning systems.

11. The apparatus of claim 10 wherein the satellite-based positioning means is the Global Positioning System.

12. The apparatus of claim 11 wherein the satellite-based positioning means comprises an antenna and a receiver.

13. The apparatus of claim 12 further comprising a global positioning system processor.

14. The apparatus of claim 1 wherein the third computational means for calculating the heading sensor bias drift rate comprises a Kalman filter.

15. The apparatus of claim 1 wherein the fourth computational means for integrating the first vehicle heading and the second vehicle heading into an integrated vehicle heading comprises a Kalman filter.

16. The apparatus of claim 1 wherein the fifth computational means for integrating the first vehicle position and the second vehicle position into an integrated vehicle position comprises a Kalman filter.

17. The apparatus of claim 1 further comprising an application specific device.

18. The apparatus of claim 17 wherein the application specific device is a unit for matching the corrected vehicle position with a map contained in the application specific device.

19. The apparatus of claim 18 further comprising a unit for displaying the map contained in the application specific device and identifying the corrected vehicle position on the displayed map.

20. The apparatus of claim 17 wherein the application specific device is a transmitter, wherein the transmitter transmits the vehicle heading and position data to a service center having a receiver.

21. A method for correcting heading and position error induced by a sensor drift in a vehicle navigational system, comprising the steps of:

(a) transmitting heading data from a heading sensor to a dead reckoning system having a memory and storing the heading data in a memory of the dead reckoning system;

(b) transmitting distance traveled data from a distance-traveled sensor to the dead reckoning system and storing the distance traveled data in the memory of the dead reckoning system;

(c) transmitting heading sensor bias data from the heading sensor to the dead reckoning system and storing the heading sensor bias data in the memory of the dead reckoning component;

(d) transmitting reference position data from a satellite to the reference vehicle position system;

(e) calculating a heading sensor bias drift rate using the data transmitted to the dead reckoning system and stored in the memory of the dead reckoning system;

(f) estimating a vehicle heading using the heading data transmitted to the dead reckoning system and stored in the memory of the dead reckoning system;

(g) estimating a vehicle position using the distance traveled data transmitted to the dead reckoning system and stored in the memory of the dead reckoning system and the estimated vehicle heading;

(h) calculating an integrated vehicle heading using the estimated vehicle heading and the reference position data transmitted to the reference vehicle position system;

(i) determining whether the integrated vehicle heading requires correction;

(j) calculating an integrated vehicle position using the estimated vehicle position and the position data transmitted to the reference vehicle position system;

(k) determining whether the integrated vehicle position requires correction;

(l) calculating a heading correction using the calculated heading sensor bias drift rate;

(m) calculating a position correction using the calculated heading correction;

(n) correcting the vehicle heading using the calculated heading correction; and (o) correcting the vehicle position using the calculated position correction.

22. A computer readable medium having stored therein instructions for causing a central processing unit to execute the method of claim 21.

23. The method of claim 21 wherein the method is performed in real-time in the vehicle.

24. The method of claim 21 further comprising the step of transmitting the stored heading and position data to a service center, wherein steps (e) to (o) of the method are performed in non-real time at the service center.

25. The method of claim 21 wherein the method is iterated periodically.

26. The method of claim 25 wherein the method is iterated at a frequency of 1 iteration per second.

27. The method of claim 21 wherein the step of calculating a heading sensor bias drift rate is iterated when the vehicle reaches a stationary point.

28. The method of claim 21 wherein the step of calculating a heading sensor bias drift rate comprises the steps of:

(a) taking a first measurement of heading sensor bias when the vehicle reaches a first stationary point, (b) taking a second measurement of heading sensor bias when the vehicle reaches a second;

(c) determining the time elapsed between the first and second vehicle stationary points; and (d) dividing the difference between the measured heading sensor bias at the second stationary point and the measured heading sensor bias at the second stationary point by the time elapsed between the first and second vehicle stationary points.

29. The method of claim 28 wherein the step of calculating a heading sensor bias drift rate is iterated only when the vehicle reaches a stationary point and the time elapsed between stationary point exceeds a predetermined minimum time.

30. The method of claim 21 further comprising the step of setting a heading sensor bias drift rate flag to a non-zero value after the heading sensor bias drift rate is calculated to indicate the availability of a heading sensor bias drift rate update.

31. The method of claim 30 wherein the step of calculating a heading correction is iterated when the bias drift rate flag is set to a non-zero value.

32. The method of claim 21 wherein the heading sensor is a gyroscope.

33. The method of claim 21 wherein the heading sensor is a low-cost gyroscope.

34. The method of claim 21 wherein the heading sensor is a vibrational gyroscope.

35. The method of claim 21 wherein the distance-traveled sensor is an odometer.

36. The method of claim 21 wherein the dead reckoning system comprises a dead reckoning processor, a heading sensor interface, and a distance-traveled sensor interface.

37. The method of claim 36 wherein the heading sensor interface is a gyroscope interface.

38. The apparatus of claim 36 wherein the distance-traveled sensor interface is an odometer interface.

39. The method of claim 21 wherein the reference vehicle position system comprises a satellite-based positioning system.

40. The method of claim 39 wherein the satellite-based positioning system is the Global Positioning System, GLONASS, or Galileo satellite positioning systems.

41. The apparatus of claim 40 wherein the satellite-based positioning system is the Global Positioning System.

42. The method of claim 41 wherein the satellite-based positioning system comprises an antenna and a receiver.

43. The method of claim 42 wherein the satellite-based positioning system further comprises a global positioning system processor.

44. The method of claim 21 wherein the means for integrating the first vehicle heading and the second vehicle heading into an integrated vehicle heading comprises a Kalman filter.

45. The method of claim 21 wherein the step of calculating a heading sensor bias drift rate utilizes a Kalman filter.

46. The method of claim 21 wherein the step of calculating an integrated vehicle heading utilizes a Kalman filter.

47. The method of claim 21 wherein the step of calculating an integrated vehicle position utilizes a Kalman filter.

48. The method of claim 21 further comprising the step of transmitting the corrected vehicle heading and corrected vehicle position to an application specific device.

49. The method of claim 48 wherein the application specific device is a unit for matching the corrected vehicle position with a map contained in the application specific device.

50. The method of claim 49 wherein the application specific device further comprises a unit for displaying the map contained in the application specific device and identifying the corrected vehicle position on the displayed map.

51. The method of claim 49 wherein the application specific device comprises a transmitter, and wherein the transmitter transmits the vehicle heading and position data to a service center having a receiver for off-line calculation of the corrected vehicle position and corrected vehicle heading.

* * * * *